US008428421B2

(12) United States Patent
Bhogal et al.

(10) Patent No.: US 8,428,421 B2
(45) Date of Patent: Apr. 23, 2013

(54) PLAYBACK OF DAMAGED VIDEO MEDIA USING DOWNLOADED CONTENT

(75) Inventors: Kulvir Singh Bhogal, Pflugerville, TX (US); Gregory Jensen Boss, American Fork, UT (US); Rick Allen Hamilton, II, Charlottesville, VA (US); Brian Marshall O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 12/366,739

(22) Filed: Feb. 6, 2009

(65) Prior Publication Data

US 2010/0202764 A1 Aug. 12, 2010

(51) Int. Cl.
*H04L 29/06* (2006.01)

(52) U.S. Cl.
USPC .............................. 386/47; 715/716

(58) Field of Classification Search ............. 386/47; 715/716
See application file for complete search history.

(56) References Cited

U.S. PATENT DOCUMENTS

| | | | |
|---|---|---|---|
| 5,808,662 A | 9/1998 | Kinney et al. | |
| 6,381,608 B1 | 4/2002 | Savoie | |
| 6,625,385 B2 | 9/2003 | Collin et al. | |
| 6,662,329 B1 | 12/2003 | Foster et al. | |
| 7,113,773 B2 | 9/2006 | Quick, Jr. et al. | |
| 7,114,172 B2 | 9/2006 | Lord | |
| 7,246,367 B2 | 7/2007 | Livonen | |
| 7,386,219 B2 | 6/2008 | Ishige | |
| 7,669,219 B2 | 2/2010 | Scott, III | |
| 2002/0087661 A1 | 7/2002 | Matichuk et al. | |
| 2003/0016673 A1 | 1/2003 | Pendakur et al. | |
| 2003/0056220 A1 | 3/2003 | Thornton et al. | |
| 2003/0086694 A1 | 5/2003 | Davidsson | |
| 2003/0099462 A1 | 5/2003 | Matsugami | |
| 2003/0156827 A1 | 8/2003 | Janevski | |
| 2003/0219228 A1 | 11/2003 | Thiagarajan et al. | |
| 2004/0151474 A1 | 8/2004 | Suh | |
| 2005/0246749 A1 | 11/2005 | Tsuruga et al. | |
| 2006/0052067 A1 | 3/2006 | Singh et al. | |
| 2006/0062147 A1 | 3/2006 | Dougall et al. | |
| 2006/0174293 A1 | 8/2006 | Ducheneaut | |
| 2006/0288361 A1 | 12/2006 | White Eagle et al. | |
| 2007/0040936 A1 | 2/2007 | Park | |

(Continued)

OTHER PUBLICATIONS

Office Action in U.S. Appl. No. 11/875,370 mailed Nov. 21, 2011.

*Primary Examiner* — Jeffrey Pwu
*Assistant Examiner* — Thong Truong
(74) *Attorney, Agent, or Firm* — Mitch Harris, Atty at Law, LLC; Andrew M. Harris; Arthur J. Samodovitz (57) ABSTRACT

A method, system and computer program provide a mechanism for playing damaged digital video media and optionally notifying a service agency of the damage. When a defect is located on media, the DVD player reads the media to determine damaged portions of the video program. Once the damaged portion is identified, the DVD player downloads content from a remote content provider, such as the content producer, a rental agency, or a third party provider. The content may be downloaded during or prior to video playback. Rental agencies or other providers may be notified of damaged media by network message. When a defect is located during playback and content is downloaded, the DVD player transmits user and disc identification data encoded in the DVD player and on the media across the network to the agency. The agency may use the information to flag the media for removal from circulation upon return.

12 Claims, 7 Drawing Sheets

U.S. PATENT DOCUMENTS

| | | |
|---|---|---|
| 2007/0083814 A1* | 4/2007 | Wilbrink et al. ............... 726/26 |
| 2007/0189708 A1 | 8/2007 | Lerman et al. |
| 2007/0283403 A1 | 12/2007 | Eklund et al. |
| 2008/0010518 A1 | 1/2008 | Jiang et al. |
| 2008/0086743 A1* | 4/2008 | Cheng et al. ................... 725/38 |
| 2008/0189380 A1 | 8/2008 | Bosworth |
| 2008/0313402 A1 | 12/2008 | Wong et al. |
| 2009/0044216 A1 | 2/2009 | McNicoll |
| 2009/0074380 A1 | 3/2009 | Boston et al. |
| 2009/0199013 A1 | 8/2009 | Raciborski et al. |
| 2009/0220216 A1 | 9/2009 | Marsh et al. |
| 2009/0249000 A1* | 10/2009 | Nielsen ........................ 711/159 |
| 2009/0263101 A1 | 10/2009 | Rudolph et al. |
| 2010/0107104 A1 | 4/2010 | Bruce et al. |
| 2011/0030012 A1 | 2/2011 | Diaz Perez |

* cited by examiner

PLAYBACK OF DAMAGED VIDEO MEDIA USING DOWNLOADED CONTENT

BACKGROUND OF THE INVENTION

1. Field of the Invention

The present invention is related to consumer digital versatile disc (DVD) players and optical media. More particularly, the present invention is related to a method and system that overcomes errors due to uncorrectable defects in optical media by downloading portions of a video program corresponding to damaged portions of the media.

2. Description of Related Art

Digital versatile disc (DVD) players, which may be connected to a television set, contained with a portable device having an LCD screen, or included in a computer system having a video display, are in widespread use in households and other locations.

DVD and other optical media tend to become damaged after long periods of use or after exposure to extreme handling or environments. Damage to the physical media compromises the integrity of the information encoded therein. Traditionally, once media is damaged, the DVD player corrects the error using error-correcting encoding. If an uncorrectable error is present, the DVD player notifies the user through the use of an error screen, or by skipping to a section of the media that is undamaged. While these above-described techniques still allow the remaining media to be played, the entire disc content cannot be enjoyed. Damaged media is an inconvenience to the user, especially for members/customers of mail-based DVD rental services. When a disc is scratched, a user will typically request a replacement, and must wait a number of days for it to arrive.

Users of mail-based rental agencies sometimes send back damaged media without complaint. Failure to draw attention to damaged media means that later renters that receive damaged media in circulation will have the same playback issues and suffer the same inconveniences.

Therefore, it would be desirable to provide a method and system that can play a video program contained on damaged media, even when portions of the video program are unreadable from the media due to uncorrectable errors, such as those caused by physical damage to the media. It would further be desirable to provide a method and system to remove damaged media from rental circulation.

BRIEF SUMMARY OF THE INVENTION

The invention is embodied in a method, system and a computer program product. The computer program product includes program instructions for execution by a general-purpose computer such as a personal computer or by a dedicated digital versatile disc (DVD) player. The DVD player may be a personal video player, set-top box, personal computer, or any other device that provides playback of digital video content.

A DVD containing digital media having uncorrectable errors is played by a DVD player. By reading the data channels of the digital media, the DVD player determines the unreadable content, which may be determined by predicting the extent of the damage to the DVD. The unreadable content is downloaded from a remote content provider, which may be the rental service itself or a third party provider, with the missing content "repairing" the gap caused by the defect. The content may be downloaded as the disc is playing or may be downloaded prior to playback and stored in general memory of the DVD player for one or more playback sessions. The downloaded video content may be encoded differently than the video content present on the DVD. The downloaded repair content may be matched using timestamp information, but other techniques may be employed, such as frame counts. Download of the repair content may require authentication, which may require specific input from the user that verifies the user's identity.

In a separate embodiment of the invention, the DVD player collects user identification data which may be stored in the memory of the player itself and DVD identification data which may be encoded on the DVD. The identification data is sent to a remote service (e.g., a rental agency or a content source). For rental DVDs, the identification information serves as a notification to remove the damaged DVD from circulation upon return of the DVD by the user.

The media scanning and defect detection is generally performed by a system and computer program present in the DVD player. Identification information received from the digital media and the digital video player are transmitted to a remote server which may be a server associated with the rental service, with the content source, or with a third party service. The server may validate the credentials of the user and the DVD, and transmit the necessary content for complete playback of the damaged media.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to systems and devices that remedy playback when defective areas causing uncorrectable errors exist on digital video media played in digital video (DVD) players and, in some embodiments, to systems that notify a service agency upon defect detection. In one embodiment, upon detection of a defect on the digital video media, the media is scanned to determine a predicted area of damage.

The predicted area is matched to the data encoded onto the surface of the media. The system combines the identification information for the user and the media and uses that information as validation to perform a download of missing content. Upon notification of the damage, a rental service or other agency can flag the particular media for removal from circulation. Following validation, the DVD player connects to a remote content provider and downloads the portion of the media's content that is defective. The downloaded portion can either be played simultaneous to the download, or can be saved in memory in the DVD player for multiple plays of the defective media. The defect detection and prediction techniques are generally implemented locally in the DVD player. All communication between the DVD player and the service agency, the remote content provider, or the third party service agency is generally performed over an internet connection or other network connection accessible to the DVD player.

Figure 1:
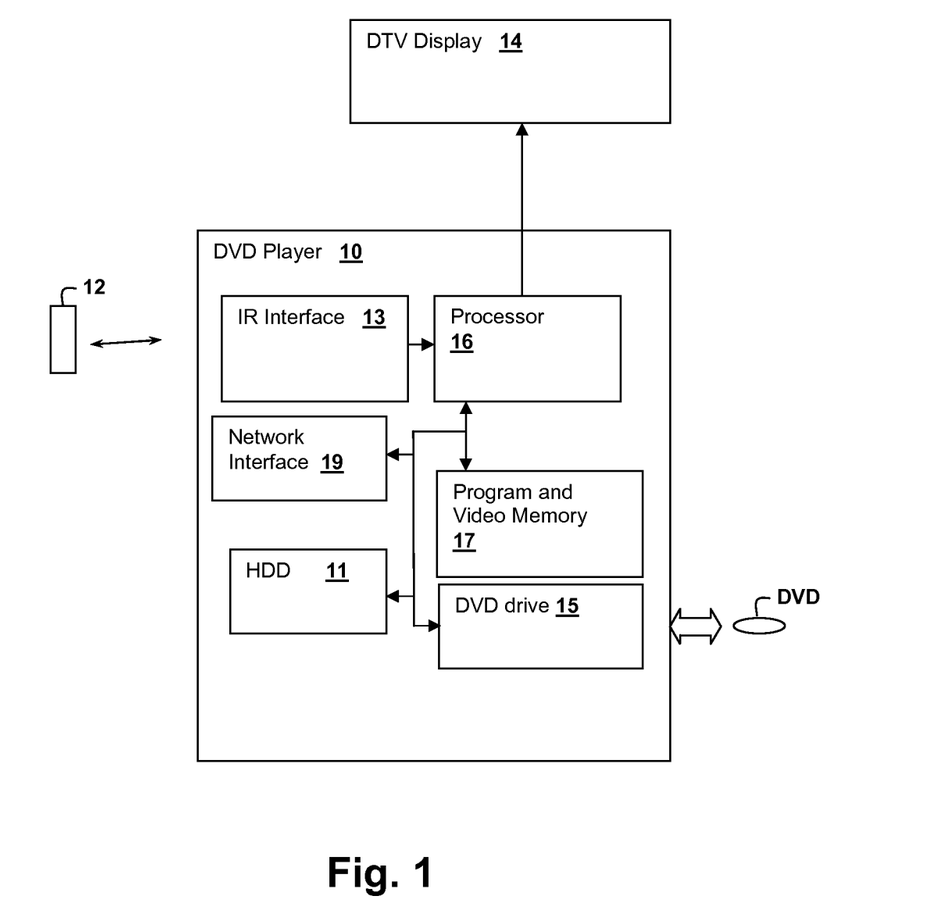
FIG. 1 is a block diagram illustrating a digital video player in accordance with an embodiment of the present invention.

Referring now to FIG. 1, a DVD player 10, in accordance with an embodiment of the invention, is shown. DVD player 10 is illustrated as connected to an external digital television (DTV) display 14, but DVD player 10 may alternatively be a portable device having an integrated display. A remote control 12 is used to control operation of digital video player 10. However, it is understood that other user input methodologies can be employed, such as buttons and other controls integral to DVD player 10. DVD player 10 includes an infrared (IR) interface 13 for receiving commands from remote control 12, a processor 16 for executing program instructions that implement the defect detection, content download, content playing, and communication techniques of the present invention, in accordance with methodologies described in further detail below, and also provides control and other functionality as generally associated with DVD player operations. A program and video memory 17 is coupled to processor 16 for storing data and program instructions, including program instructions in accordance with a computer program product embodiment of the present invention. A network interface 19 provides connection to public or private networks such as the Internet, for receiving content to be played during media play, and for communicating with service agencies. A DVD drive 15 is included for the playback of digital video media such as DVD disc DVD and a hard disk drive (HDD) 11 is also included in DVD player 10 for maintaining user identification data, service agency identification data, recording video programs and storing downloaded program content. Alternatively, or in combination, the "repair" content may be stored in program and video memory 17. The repair content may be in a different media format than the digital video encoded on DVD disc DVD. Timestamp or frame count matching may be employed to determine suitable cut points for insertion of the repair content.

Figure 2:
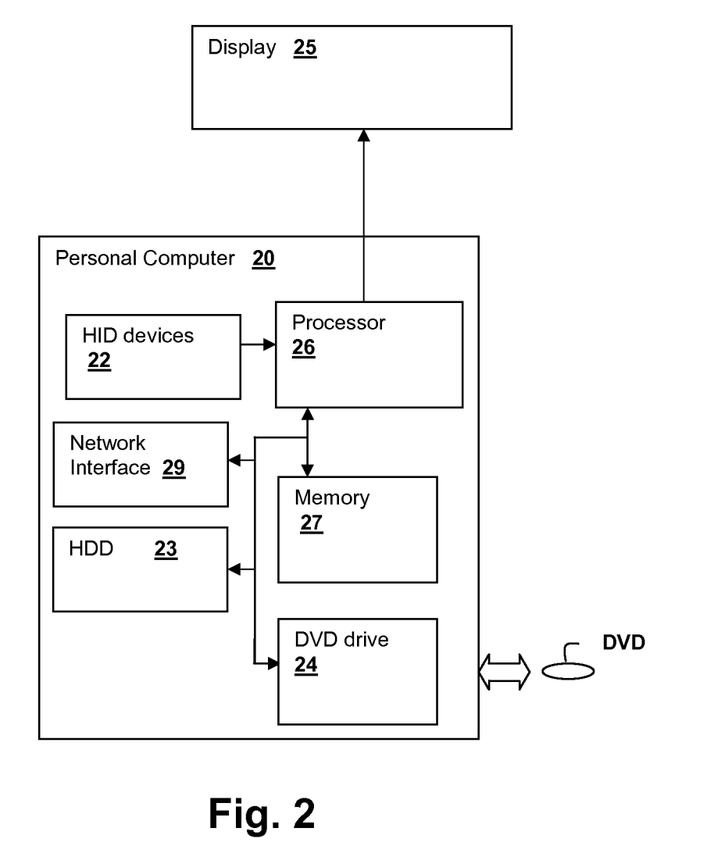
FIG. 2 is a block diagram illustrating a digital video player in accordance with another embodiment of the present invention.

Referring now to FIG. 2, a DVD player in accordance with another embodiment of the invention is illustrated, in the form of a personal computer system 20. The DVD player of FIG. 2 is implemented by a personal computer 20, which includes a processor 26 coupled to a memory 27 for storing program instructions including program instructions for implementing a digital video player. Memory 27 further includes program instructions for carrying out techniques in accordance with the present invention, which are integrated in such DVD player program to implement the defect detection, content download, and notification techniques of the present invention, in accordance with methodologies described in further detail below, and also provides control and other functionality as generally associated with DVD player operations. The program may be loaded into memory 27 or HDD 23 via a DVD drive 24 from a data storage media forming a computer program product in accordance with an embodiment of the present invention, such as DVD DVD. DVD DVD is also illustrative of a digital video media which may be previously damaged and "repaired" in accordance with an embodiment of the present invention as described in further detail below. Personal computer 20 also includes a human interface device (HID) interface 22 for connection of HIDs, such as keyboards and pointing devices. Personal computer 20 is also illustrated as connected to an external display 25. However, if personal computer 20 is a laptop, tablet or other integrated device, display 25 will generally be internal to personal computer 20.

Figure 3:
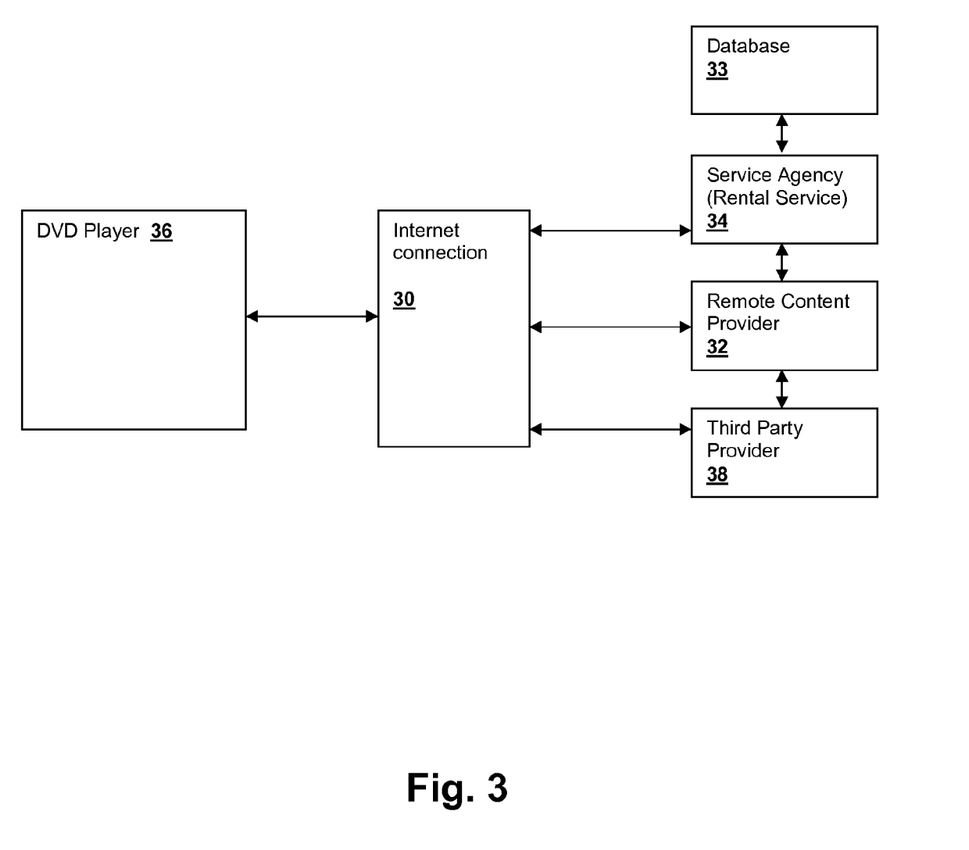
FIG. 3 is a block diagram illustrating a system in accordance with an embodiment of the present invention.

Referring now to FIG. 3, a networked system in accordance with an embodiment of the present invention is shown. A DVD player 36, sends and receives data over an internet connection 30. DVD player 36 is coupled to a remote content provider 32 and service agency 34, (e.g., a rental service) via internet connection 30. DVD player 36 includes special programming and features, such as downloading processes for obtaining content from secure sites, damaged area detection processes, damage area prediction processes, and processes dedicated to gathering and combining identification/authentication information and transmitting that data through internet connection 30 to the service agency 34. Content corresponding to the area of the damage is determined by DVD player 36. DVD player 36 connects to remote content provider 32 or service agency 34 to download content corresponding to the damaged areas. DVD player 36 may play the downloaded content simultaneously with the downloading process, or may save the repair content in storage, such as HDD 11 of FIG. 1 or HDD 23 of FIG. 2 for repair of content to be played later.

In accordance with an embodiment of the present invention, service agency 34 maintains user accounts accessible using user identification information stored by DVD player 10 and transmitted to service agency 34 as described above with reference to FIG. 1. Service agency 34 also has access to a queue of rented media in each particular user's account within database 33. By using the media identification data which may be encoded on DVD DVD described above and also transmitted to service agency 34, service agency 34 can match the identification of the titles in user's rented queue stored in database 33 to the media identification data. Service agency 34 determines whether DVD DVD is an authorized rental copy and sends authorization to remote content provider 32 to transfer content corresponding to the defective area(s) of DVD DVD.

In accordance with another embodiment of the present invention, service agency 34 receives data identifying the user and identifying the media as described above. From the identification information, service agency 34 may flag DVD DVD for removal from circulation by updating records in database 33 to reflect that DVD DVD is damaged. As an alternative to requiring user identification, DVD DVD may bear a globally unique identifier (GUID) and both repair content access and damage notification may be performed in response to receipt of a valid GUID.

It is understood that other techniques and system configurations may be applied in accordance with other embodiments of the present invention and the particular system configuration of FIG. 3 should not be construed as limiting the possible network configurations and end-user appliances that implement techniques in accordance with the present invention as described in further detail below. For example, remote content provider 32 may be implemented by service agency 34 or another third party. DVD player 36 may be implemented by a personal computer system similar to that shown in FIG. 2, but will still generally include the special features described above.

Figure 4A:
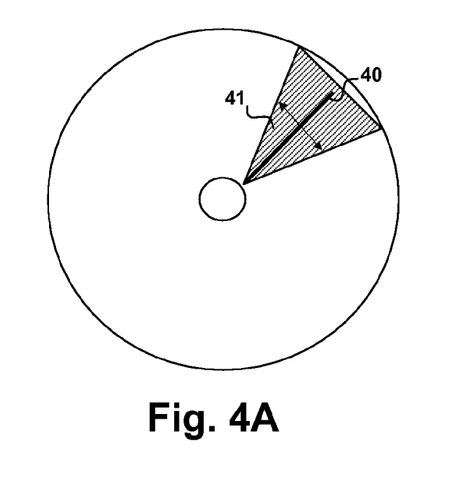
FIGS. 4A, 4B, 4C, and 4D are pictorial diagrams illustrating examples of common defects and predicted areas of damage as may be repaired by techniques of the present invention.

Referring now to FIGS. 4A-4D, an embodiment of the present invention is illustrated that includes a digital media scan component that performs defect detection, and uses area prediction to determine the extent of content that will likely require replacement. According to the most commonly occurring patterns of damage, particular data acquisition sequences may be followed upon finding particular damage patterns. FIG. 4A illustrates a damaged media that may be repaired by a method and system in accordance with an embodiment of the present invention. The media of FIG. 4A has a radial pattern defect 40. Radial pattern defect 40 describes a defect pattern in which the damage runs along a radius of the media. In the defect detection phase, the media is checked for damage at physical locations adjacent to the detected defect, in both directions along a radial extension. If no further damage is detected immediately adjacent to the defect, the adjacent areas along a circumferential arc will be checked. The defect checking will continue until a predetermined threshold of distance is exceeded. If further damage is detected in the checking process, area prediction will be invoked from the location of the initial defect and in a direction of the additional defects. Predicted radial area 41 shows the area of the disc where data may require replacement through download of repair data as described above, and the directions in which data will be filled. The first data to be downloaded is content associated with a region extending along a radius from the initial defect area to the edge of the media. After the data along the initial line is acquired, the data adjacent to the initial line in alternating directions along circumferential arcs is acquired.

Figure 4B:
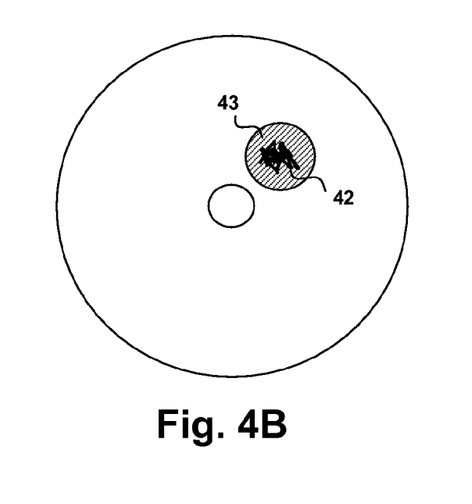

Referring now to FIG. 4B, another damaged media is illustrated that may be repaired by a method and system in accordance with an embodiment of the present invention. The media of FIG. 4B has a circular-blotch defect pattern 42. Circular-blotch defect pattern 42 is a defect pattern in which the damaged area is constrained to a circular or semi-circular area. In the defect detection stage, the media is checked for additional damage at locations in multiple directions and distances, radiating outward from the initial defect point. The radiating scan is continued until a predetermined threshold of distance from the initial defect is exceeded. If further damage is detected within the defect detection stage, area prediction will be invoked from the location of the initial defect in the direction of the additional defects. Predicted circular area 43 shows the area of the disc where data will need to be replaced through download as described above. The predicted area is a circular region that radiates outward from an initial defect point. The initial defect may be at the edge, center, or anywhere within the circular region. The first content acquired is the content located at the initial defect, and content acquisition continues in a circular pattern radiating outward from the initial defect location until the extent of the damage area is reached.

Figure 4C:
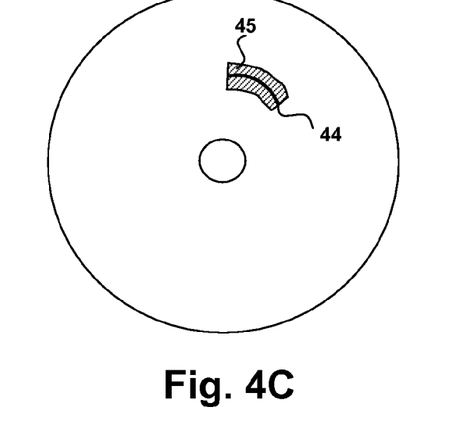

Referring now to FIG. 4C, another damaged media is illustrated that may be repaired by a method and system in accordance with the present invention. The media of FIG. 4C has a rotational defect pattern 44. Rotational defect pattern 44 is a defect pattern in which the damaged area runs in a circumferential arc constant with the arc of the data track. In the defect detection stage, the media is checked for damage at the physical location immediately along the arc. If further damage is not detected immediately along the arc, adjacent arcs are checked for defects. The detection process continues further from the area of the initial defect until a predetermined threshold of distance from the initial defect is exceeded. If further damage is detected within the defect detection stage, the area prediction will be invoked with the location of the initial defect and the direction of additional defects. Predicted rotational area 45 shows an area where data will likely require replacement through repair download as described above. The predicted area is an arc that runs along a circumferential direction along the media from an initial defect until the end of the defect for the rotational region is detected. The arc may deviate from a true circumferential arc. The first content acquired is content associated with an arc starting from the initial defect, and content acquisition continues until the edge of the defect is detected or a predetermined distance. After the initial content of the arc is acquired, data is acquired adjacent to the initial arc, alternating directions until data associated with a wider arc-shaped region is acquired.

Figure 4D:
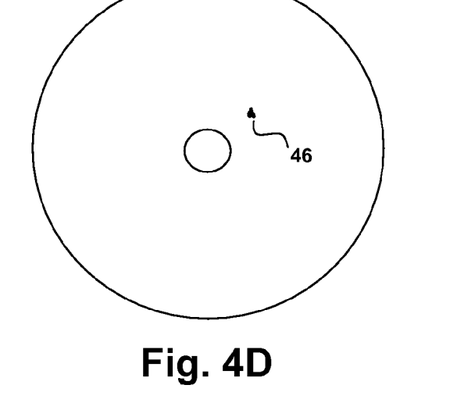

Referring now to FIG. 4D, another damaged media is illustrated that may be repaired by a system in accordance with an embodiment of the present invention. The media of FIG. 4D has a spot pattern 46. Spot pattern 46 describes a pattern defect where the damaged area occupies a relatively small area of the media. If none of the patterns as shown in FIG. 4A, 4B, or 4C are detected, the defect is treated as a spot defect and only content associated with a region immediately surrounding the physical location of the defect will be acquired.

The defect detection process described above is not a requirement of the present invention. Alternatively, repair data requirements can be determined by scanning the media for data channel errors according to the logical organization of data rather than determining physical regions to repair. The repair data requirements can also be determined as needed, rather than predicting potential areas that require replacement data.

Figure 5A:
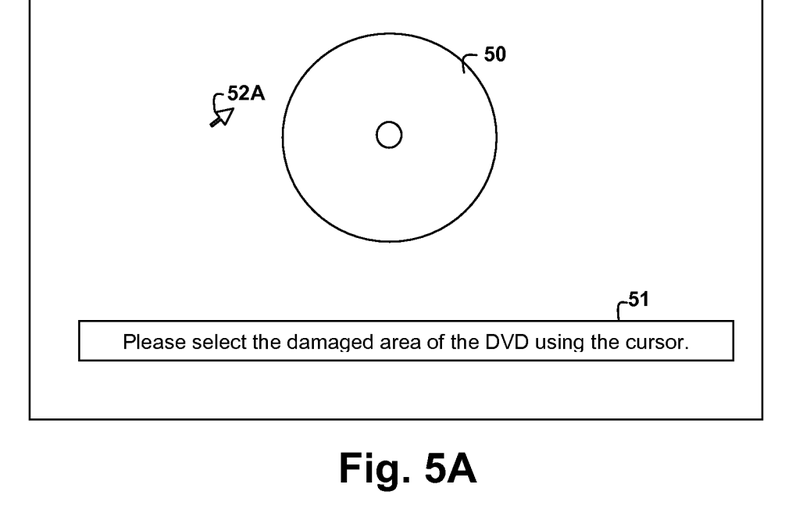
FIGS. 5A and 5B are pictorial diagrams of user interface displays in accordance with embodiments of the present invention.

Referring now to FIG. 5A, a user interface in accordance with an embodiment of the present invention is illustrated, showing a screen that may be presented to a user of DVD player 10 of FIG. 1, personal computer 20 of FIG. 2, or DVD player 36 of FIG. 3. Using remote control 12 of FIG. 1, or HID 22 of FIG. 2, a user may graphically indicate an area of damage on the media using a cursor 52A to select an area on disc graphic 50. The user is instructed by a prompt 51 to select an area on disc graphic 50. The area selected by the user is translated by DVD player 10 of FIG. 1, personal computer 20 of FIG. 2, or DVD player 36 of FIG. 3 into the damaged area of DVD DVD. The content in the area specified by the user will be acquired using procedures such as those described above with reference to FIGS. 1-3.

Figure 5B:
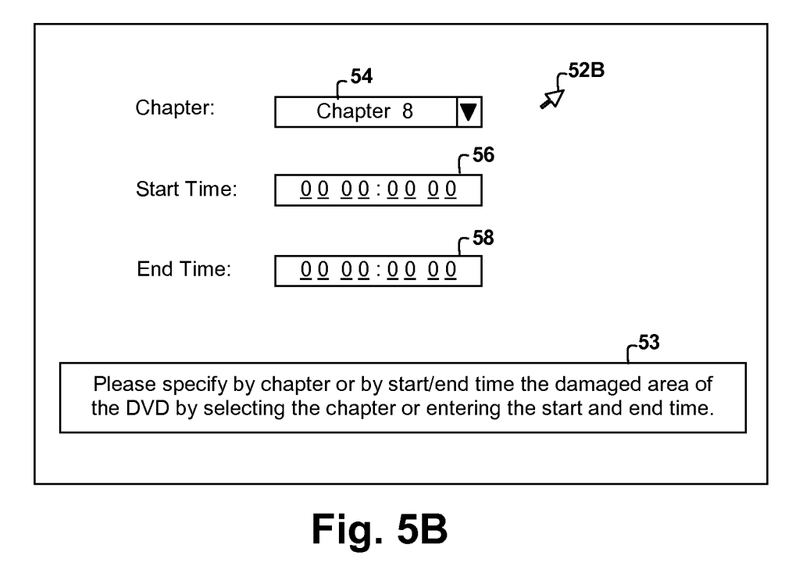

Referring now to FIG. 5B, a user interface in accordance with another embodiment of the present invention is illustrated, showing a screen that may be presented to a user of DVD player 10 of FIG. 1, personal computer 20 of FIG. 2, or DVD player 36 of FIG. 3. Using remote control 12 of FIG. 1, or HID 22 of FIG. 2, a user may manually select a portion of the disc that is damaged by specifying a location within the content. The user is instructed by a prompt 53 to either select a chapter using a dropdown menu 54 with cursor 52B or enter a start time 56 and end time 58. The portion of the content specified by the user will be acquired using the repair procedures described above.

Figure 6:
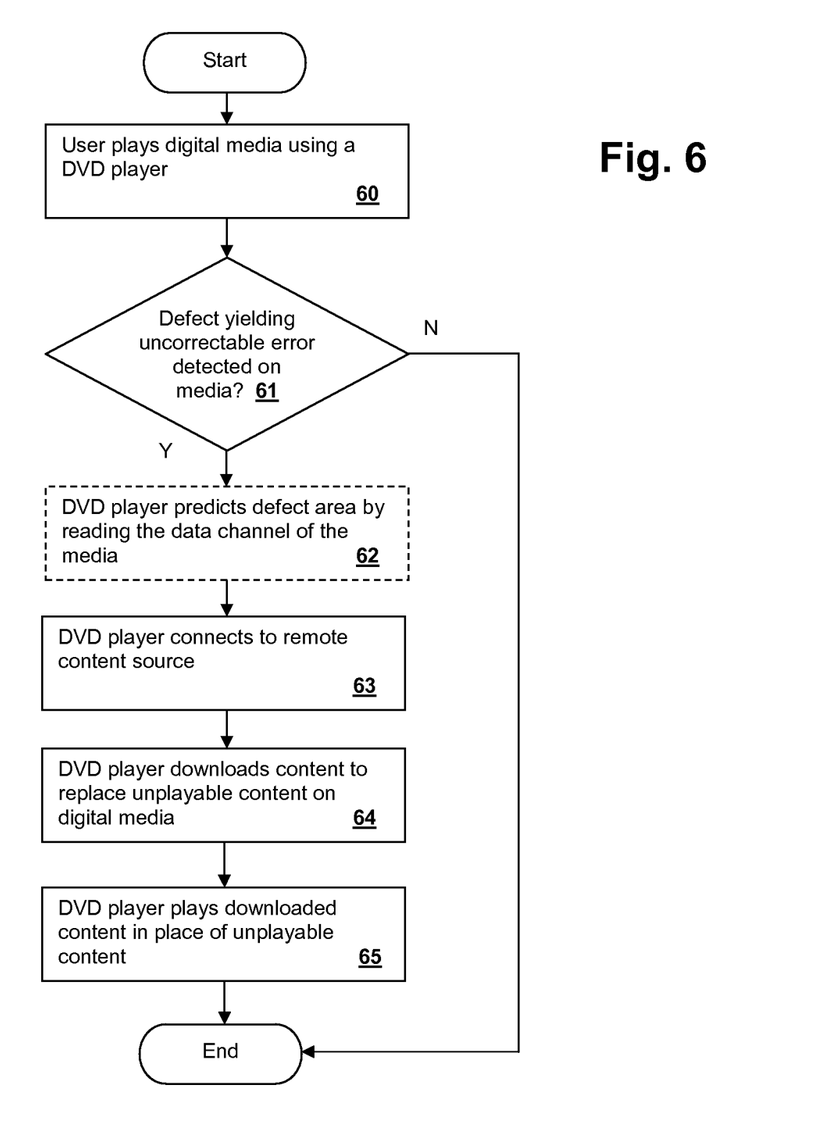
FIG. 6 is a flowchart of a method in accordance with an embodiment of the present invention.

Referring now to FIG. 6, a method according to an embodiment of the present invention is illustrated in a flowchart. The depicted method corresponds to a local program for performing the defect detection, content downloading and playback, and service agency notification techniques as described above. A user plays a digital video media in a DVD player (step 60). If a defect is detected during playback of the media (decision 61), then the DVD player optionally determines the area of the defect (step 62) and predicts corresponding video to acquire from the remote content source after connection (step 63). The DVD player downloads content which replaces unplayable content corresponding to the predicted defect area on the media (step 64). The DVD player plays the downloaded content in the place of the unplayable content (step 65) when playback reaches a "repaired" portion of the content.

Figure 7:
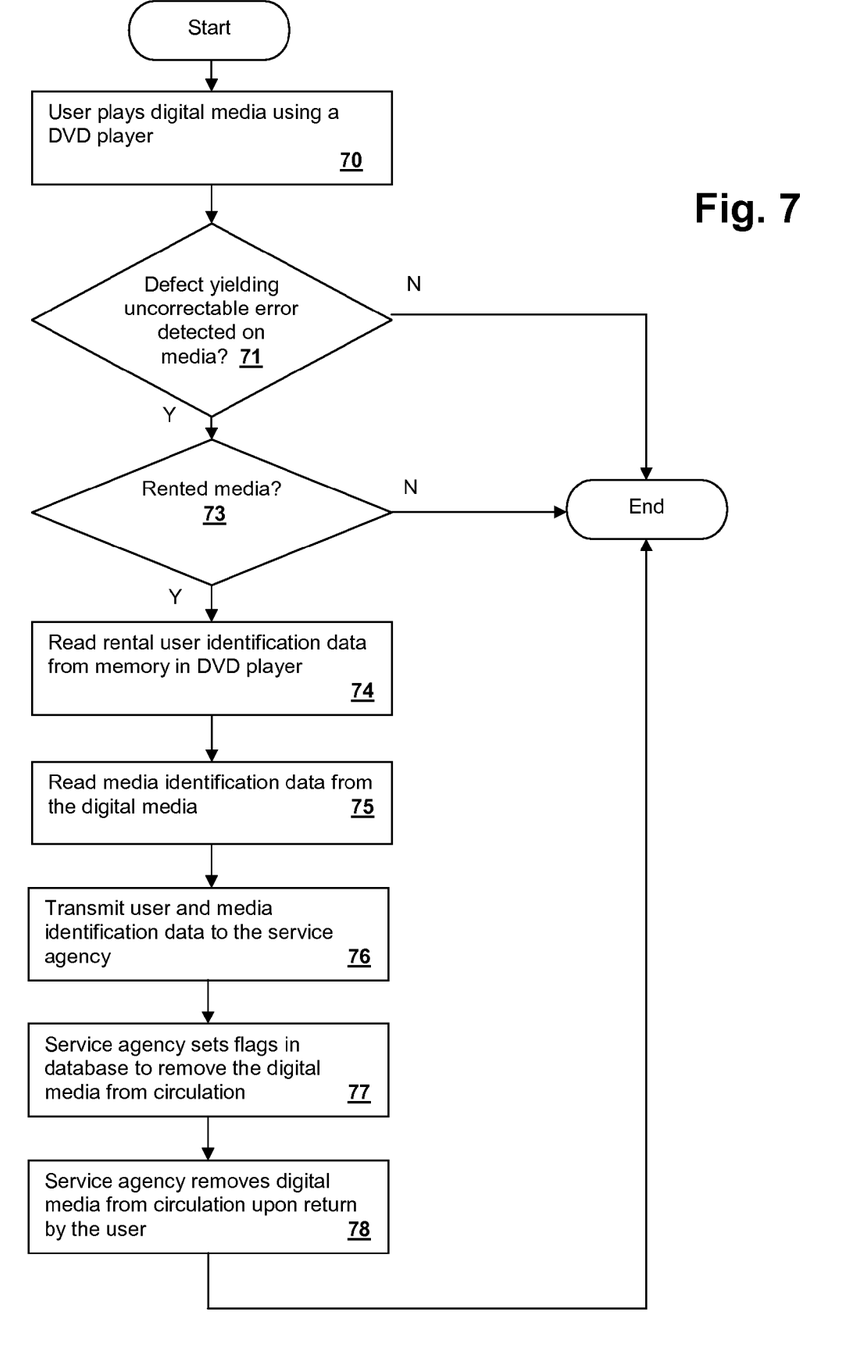
FIG. 7 is a flowchart of a method in accordance with another embodiment of the present invention.

Referring now to FIG. 7, a method according to another embodiment of the present invention is illustrated in a flowchart. The depicted method corresponds to a local program for performing the defect detection, and service agency notification techniques as described above. A user plays a digital video media in a DVD player (step 70). If a defect is detected during playback of the media (decision 71) and if the media is rented (decision 73), then the DVD player reads the user identification information stored in the memory of the DVD player (step 74) and reads media identification data encoded in the digital media (step 75). The user identification data and the media identification data are transmitted to the service agency (step 76), and the service agency flags the copy of the media for removal from circulation upon return by the user (step 77). When the media is received by the service agency, the service agency removes it from circulation (step 78).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of playback of digital video from an optical digital video media, the method comprising:
    detecting, by a processor within a digital video playback device, a defect in the optical digital video media that renders portions of a video program encoded on the optical digital video media unplayable;
    determining, by the processor, an unplayable portion of the video program that is unplayable due to the defect, by displaying a graphical representation of the optical digital video media and receiving a user input describing a shape of a damaged region of the optical digital video media on the displayed graphical representation of the optical digital video media from user movement of a cursor selecting a region of the display of the graphical representation corresponding to the shape of the damaged region of the optical digital video media;
    requesting, by the processor responsive to the determining, download of the unplayable portion of the video program from a remote content provider as a downloaded replacement portion of the video program;
    receiving, by the processor, download of the downloaded replacement portion of the video program; and
    directing, by the processor, playback of a playable portion of the video program on the digital video playback device and further directing playback of the downloaded replacement portion of the video program in place of the unplayable portion of the video program.

2. The method of claim 1, further comprising the processor responsive to the detecting, sending a notification to a remote system via a network that the optical digital video media is defective.

3. The method of claim 1, wherein the processor receiving download is performed during playback of the playable portion of the video program.

4. The method of claim 1, wherein the processor receiving download comprises:
    the processor establishing a connection to the remote content provider prior to the processor directing playback of the playable portion of the video program; and
    the processor saving the downloaded replacement portion in a storage within the digital video playback device, and wherein the processor directs the playback subsequent to completing the receiving.

5. A system, comprising:
    a processor for executing program instructions;
    a computer-readable storage, device coupled to the processor;
    a digital video playback device coupled to the processor for playing an optical digital video media, and wherein the system is coupled to a remote content provider via a network;
    program instructions, stored on the storage device for execution by the processor, to detect a defect in the optical digital video media that renders portions of a video program encoded on the optical digital video media unplayable;
    program instructions, stored on the storage device for execution by the processor, to determine an unplayable portion of the video program that is unplayable due to the defect, by displaying a graphical representation of the optical digital video media and receiving a user input describing a shape of a damaged region of the optical digital video media on the displayed graphical representation of the optical digital video media from user movement of a cursor selecting a region of the display of the graphical representation corresponding to the shape of the damaged region of the optical digital video media;
    program instructions, stored on the storage device for execution by the processor, to, in response to determining the unplayable portion of the video program, request download of the unplayable portion of the video program from the remote content provider as a downloaded replacement portion of the video program;
    program instructions, stored on the storage device for execution by the processor, to receive download of the downloaded replacement portion of the video program; and
    program instructions, stored on the storage device for execution by the processor, to direct playback of a playable portion of the optical digital video program on the digital video playback device of the system and to further play the downloaded replacement portion of the video program in place of the unplayable portion of the video program.

6. The system of claim 5, further comprising program instructions, stored on the storage device for execution by the processor, to, in response to detecting the defect, send a notification that the optical digital video media is defective to a remote system via the network.

7. The system of claim 5, wherein the program instructions to receive download comprise program instructions, stored on the storage device for execution by the processor, to receive download of the downloaded replacement portion of the video program during playback of the video program.

8. The system of claim 5, wherein the program instructions to receive download comprise:
    program instructions, stored on the storage device for execution by the processor, to connect to the remote content provider prior to the directing playback of the playable portion of the video program; and
    program instructions, stored on the storage device for execution by the processor, to store the downloaded replacement portion in a storage within the digital playback device, and wherein the program instructions to direct playback comprise program instructions, stored on the storage device for execution by the processor, to direct playback of the playable portion subsequent to completing storing of the downloaded replacement portion in the storage.

9. A computer program product for playing an optical digital video media, the computer program product comprising a computer-readable storage device having a plurality of program instructions stored therein for execution by a processor of a digital video recording device, the plurality of program instructions comprising:

program instructions for, within a digital video playback device, detecting a defect in the optical digital video media that renders portions of a video program encoded on the optical digital video media unplayable;

program instructions for determining an unplayable portion of the video program that is unplayable due to the defect, by displaying a graphical representation of the optical digital video media and receiving a user input describing a shape of a damaged region of the optical digital video media on the displayed graphical representation of the optical digital video media from user movement of a cursor selecting a region of the display of the graphical representation corresponding to the shape of the damaged region of the optical digital video media;

program instructions for, responsive to the determining, requesting download of the unplayable portion of the video program from a remote content provider as a downloaded replacement portion of the video program;

program instructions for receiving download of the downloaded replacement portion of the video program; and     program instructions for directing playback of a playable portion of the digital video program on the digital video playback device and for further playing the downloaded replacement portion of the video program in place of the unplayable portion of the video program.

10. The computer program product of claim 9, wherein the plurality of program instructions further comprise program instructions, responsive to detecting the defect, for sending a notification that the optical digital video media is defective to a remote system via the network.

11. The computer program product of claim 9, wherein the program instructions for receiving download comprise program instructions for receiving download of the downloaded replacement portion of the video program during playback of the playable portion of the video program.

12. The computer program product of claim 9, wherein the program instructions for receiving download comprise:

program instructions for connecting to the remote content provider prior to the directing playback of the playable portion of the video program; and     program instructions for storing the downloaded replacement portion in a storage within the digital playback device, and wherein the program instructions for directing playback comprise program instructions for directing playback of the playable portion of the video program subsequent to completing the storing.

\* \* \* \* \*